J. W. BINGLEY.
AIR BRAKE APPARATUS.
APPLICATION FILED NOV. 24, 1909.
962,547.
Patented June 28, 1910.
Fig. 1,
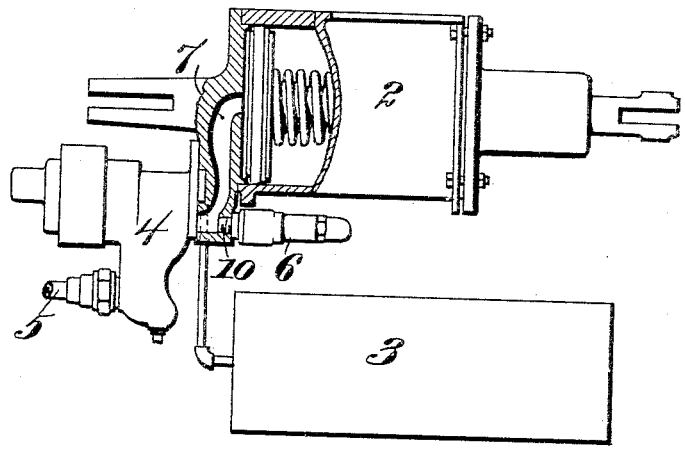
Fig. 2,
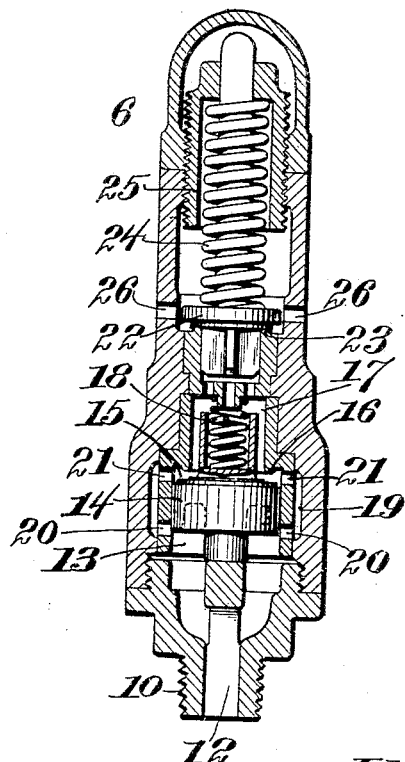
Witnesses:
Jas. J. Maloney.
Inventor:
John W. Bingley.
by H. J. Livermore
Atty.

UNITED STATES PATENT OFFICE.

JOHN W. BINGLEY, OF WATERTOWN, NEW YORK, ASSIGNOR TO NEW YORK AIR BRAKE COMPANY, A CORPORATION OF NEW JERSEY.

AIR-BRAKE APPARATUS.

962,547. Specification of Letters Patent. Patented June 28, 1910.

Application filed November 24, 1909. Serial No. 529,726.

*To all whom it may concern:*

Be it known that I, JOHN W. BINGLEY, a citizen of the United States, residing in Watertown, in the county of Jefferson and State of New York, have invented an Improvement in Air-Brake Apparatus, of which the following description, in connection with the accompanying drawings, is a specification, like numerals on the drawings representing like parts.

This invention relates to air brake apparatus, and consists in a pressure controlling device for governing the pressure in the brake cylinder under different conditions.

The invention is applicable to the well known automatic air brake system and is especially useful in connection with the brake apparatus used on fast passenger trains in which a high air pressure is maintained in the brake system.

The object of the invention is to provide means whereby, in service applications of the brakes, the brake cylinder pressure is prevented from exceeding a predetermined amount, while in emergency applications a higher pressure may be maintained in the brake cylinder.

In the brake equipments as now commonly designed for fast passenger trains it is desirable that the brake cylinder pressure should not exceed sixty pounds to the square inch in service applications of the brakes, as a higher pressure is likely to lock the wheels and cause them to slide on the rails, but in emergency applications it is desirable that a much higher pressure, say ninety pounds more or less, should be used in the brake cylinder and maintained until the train is stopped or brought under control, and provision is made in the system by which such higher brake cylinder pressure can be obtained in response to an emergency application.

The present invention consists in a valvular device having provision whereby pressure in excess of a predetermined amount, say sixty pounds to the square inch, is permitted to escape in service applications of the brakes, and also having provision whereby the escape of brake cylinder pressure is prevented in emergency applications of the brakes until exhausted through the triple valve in the usual manner of releasing the brakes.

Figure 1 is a diagrammatic view of a sufficient portion of an air brake apparatus to illustrate this invention; and Fig. 2 is a longitudinal section of the valvular appliance for governing the brake cylinder pressure in accordance with this invention.

Referring to Fig. 1, the air brake apparatus in which this invention is embodied, may comprise a brake cylinder 2, auxiliary reservoir 3, and triple valve 4, which latter controls the various communications between the train pipe 5, the brake cylinder, the auxiliary reservoir, and the atmosphere, in the well known manner.

Referring to Fig. 2, the valvular device 6 is shown as having a screw threaded connection 10 by which it is connected with the air brake apparatus, so that the passage 12 leading to the cylindrical chamber 13 is in communication with the brake cylinder, and the pressure at any time existing in the brake cylinder is also present in the said chamber 13. As shown in Fig. 1, the device 6 is connected with the passage 7 through which air is admitted to and exhausted from the brake cylinder 2 under control of the triple valve 4. The chamber 13 contains a piston or movable abutment 14 which is thus subjected to brake cylinder pressure at one side (the lower side as shown in Fig. 2), and said piston 14 is connected with or constructed to form a valve 15 coöperating with a valve seat 16 around an outlet passage 17 leading from the chamber in which the piston 14 works on the side of the piston opposite to that communicating with the inlet 12 through which the brake cylinder pressure is admitted. A spring 18 acts upon the valve 15 in a direction to keep it unseated, and a passage 19, having port openings 20, 21, leading to the chamber 13 above and below the piston 14, establishes communication from the space in the chamber 13 below the piston 14 to the space above, in communication with the outlet passage 17. This communication through 19, 20 and 21 is relatively small as compared with the capacity of the inlet passage 12 and outlet passage 17, but when the pressure rises slowly in the inlet passage 12, said communication permits the air to flow around the piston 14 so as to equalize the pressure in the outlet passage 17 above the piston with that in the inlet passage 12 and chamber 13 below the piston. The outlet passage 17 is governed by a relief valve 22 which is held pressed against a seat 23 by a predetermined force such as that of the spring 24 the force of which may be adjusted by the movable follower 25, and is made such as to balance a predetermined fluid pressure acting in the outlet passage 17 and tending to lift and unseat the valve 22. The spring force or resistance on the valve 22 is set to balance a fluid pressure in the outlet passage 17 on said valve equal to the maximum pressure desired to be carried in the brake cylinder in service applications of the brakes, and when the valve 22 is unseated the air which escapes from the outlet passage 17 past the valve, has a free exit to the atmosphere through the passages 26 in the spring chamber that incloses the spring and stem of the valve 22.

The operation of the appliance is as follows: In service applications of the brakes, the admission of air to the brake cylinder and increase in pressure therein is made relatively slowly, and the air under pressure admitted through the inlet passage 12 to the chamber 13 flows through the relatively small passages 19, 20, 21, sufficiently rapidly to increase the pressure above the piston 14 and in the outlet passage 17 sufficiently to prevent sufficient preponderance of pressure on the lower side of the piston 14, to lift the same against the action of the spring 18 to seat the valve 15, so that the air under brake cylinder pressure is thus permitted to act in the outlet passage 17 against the valve 22 tending to unseat the same, and if the pressure rises above the amount determined by the load on the valve 22, it will lift the same and permit the air to escape to the atmosphere, so that the pressure in the brake cylinder cannot rise materially above the predetermined amount. It will be observed that the piston 14, when in normal position with the valve 15 unseated, partially closes the port 20, and at its first movement in response to preponderance of pressure in the chamber below, overcoming the spring 18, it operates to enlarge the capacity of the passage around the piston, and thus enables the equalization of the pressure above the piston to take place more rapidly, the result being that the piston is not moved far enough in opposition to the spring 18 to close the valve 15, and there is, therefore, a sufficiently free egress provided for the escape of any surplus pressure past the valve 22 in case more air is admitted to the brake cylinder after the pressure has been raised to the predetermined maximum amount for service applications. In the case of an emergency application, the air is admitted to the brake cylinder much more rapidly than in service applications, and the brake cylinder pressure rises very rapidly, and the pressure in the chamber 13 rises very rapidly. Under such conditions, the capacity of the passages 19, 20, 21, is insufficient to permit the air to flow past the piston 14 and increase the pressure above the piston as rapidly as it increases below, and the preponderance of pressure below almost instantly becomes sufficient to overcome the spring 18 and cause the piston 14 to be moved up and the valve 15 to be seated, after which there is no further increase in the pressure above the piston, and it, therefore, remains holding the valve 15 seated and confining the pressure in the brake cylinder, which may then rise to an amount substantially in excess of that which would be sufficient to unseat the relief valve 22 if the pressure had access thereto. No relief of pressure or escape of air, therefore, is afforded in the case of an emergency application of the brakes, and the full pressure obtained in the brake cylinder is retained until exhausted in the usual operation of releasing the brakes.

What I claim is:

1. The combination of the brake cylinder, triple valve, and auxiliary reservoir of an automatic air brake apparatus, with a valvular appliance comprising a casing containing a chamber having an inlet communicating with the brake cylinder, and an outlet, and relief valve controlling said outlet, and adapted to be opened by predetermined pressure therein; a movable abutment between the inlet and outlet of said chamber; and a valve operated thereby for closing communication between the inlet and outlet; and a passage of relatively small capacity affording communication from one to the other side of said movable abutment, substantially as and for the purpose described.

2. A valvular appliance comprising a chamber having an inlet for fluid under pressure, and an outlet; a relief valve controlling said outlet and adapted to be opened in response to a predetermined pressure in said chamber; a movable abutment in said chamber between the inlet and outlet thereof; a valve operated thereby controlling the passage of fluid from the inlet to the outlet; and a relatively small passage affording communication from the inlet to the outlet past the said movable abutment, substantially as described.

3. A valvular appliance comprising a chamber having an inlet for fluid under pressure, and an outlet; a relief valve controlling said outlet and adapted to be opened in response to a predetermined pressure in said chamber; a movable abutment in said chamber between the inlet and outlet thereof; a valve operated thereby controlling the passage of fluid from the inlet to the outlet; a relatively small passage affording communication from the inlet to the outlet past said movable abutment, said passage being arranged to have its capacity varied by the movement of said movable abutment; and yielding means for impelling said movable abutment toward the inlet of the chamber, substantially as and for the purpose described.

In testimony whereof, I have signed my name to this specification in the presence of two subscribing witnesses.

JOHN W. BINGLEY.

Witnesses:
C. Y. COTTEE,
E. J. MINNIER.